Sept. 12, 1939.   N. GOLDBERG   2,172,675
SPACER FOR FILM REELS
Filed Oct. 24, 1938

Inventor
Nathan Goldberg.
By Martin E. Anderson
Attorney

Patented Sept. 12, 1939

2,172,675

UNITED STATES PATENT OFFICE 2,172,675

SPACER FOR FILM REELS

Nathan Goldberg, Denver, Colo.

Application October 24, 1938, Serial No. 236,803

6 Claims. (Cl. 206—53)

This invention relates to improvements in spacers for moving picture reels.

In the transportation and handling of moving picture films, they are wound on suitably constructed reels. Since a large amount of film is wound onto a single reel, the sides of the reel must, necessarily, be subject to considerable flexure when pressure is applied, as they are made from rather thin and resilient material. Owing to the fact that the film, when wound onto a reel does not wind with the edges exactly in a plane, but the separate layers are often offset slightly with respect to each other, the film is very easily injured when the sides of the reel are bent toward it as the pressure is resisted by a comparatively few layers of film. In order to prevent injury from the sides of the reel during shipping and handling, it is apparent that the reel should be provided with a spacer of slightly greater width than the film for the purpose of preventing the sides of the reel from being moved toward each other, and such spacer can also be employed for holding the film from unwinding on the reel.

It is the object of this invention to produce a spacer for moving picture film reels that shall be quite flexible in the direction of its length, but which will have considerable transverse rigidity so that when it is in place it will resist a large force tending to move the sides of the reel toward each other.

Another object of this invention is to produce a spacer of the kind indicated which shall be formed of a comparatively soft material that will not injure the film nor scratch the sides of the reel.

A further object is to provide a spacer that shall be provided with spaced transverse ridges forming compression members whose combined strength will hold the sides of the reel in spaced relation in opposition to any force that will normally be applied to the reel.

The above and other objects of this invention are attained by means of a construction and an arrangement of parts that will now be described in detail, and for this purpose reference will be had to the accompanying drawing in which the invention has been illustrated in its preferred form, and in which.

Figure 1:
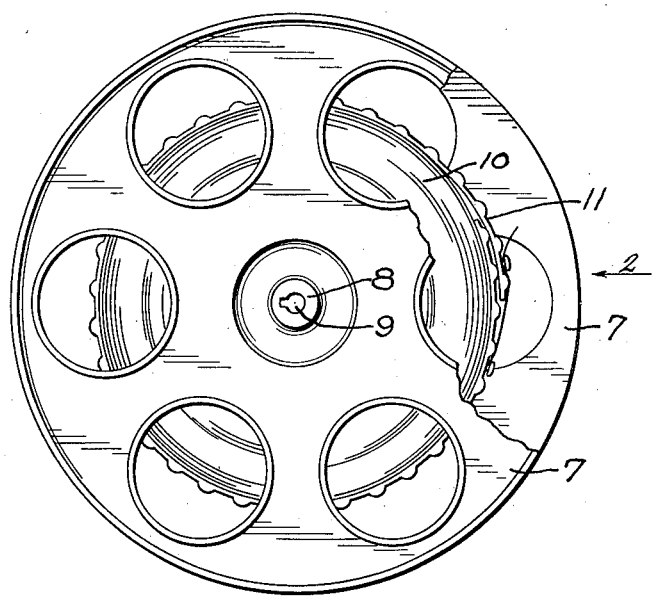
Figure 1 is a side elevation of a reel showing a length of film wound thereon and held in position by means of the improved spacer.
Figure 2:
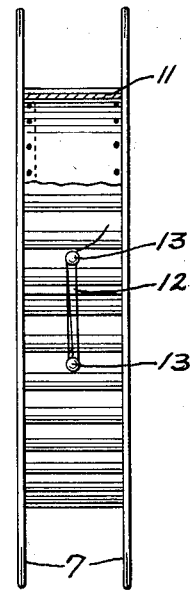
Figure 2 is a side elevation of the reel looking in the direction of arrow 2, Figure 1.

In the drawing reference numerals 7 designate the two sides of a moving picture film reel and 10 reference numeral 8 designates the hub which is provided with a non-circular opening 9, on the reel is a length of film which has been designated by the reference numeral 10. As is well known, a moving picture film is quite resilient and unless it is held by some suitable means, it will unwind and become very loose. For the purpose of holding the film against unwinding and at the same time spacing the sides of the reel so that they will not move inwardly and injure the film when subjected to some abnormal force, the film has been surrounded by the combined spacer and binder which forms the subject of this invention and which has been designated in its entirety by reference numeral 11. It will be seen from Fig. 1 that the ends of the spacer overlap and are secured together by means of a string 12 which is wound about suitable buttons 13 attached to or formed integral with the spacer adjacent each end.

Figure 4:
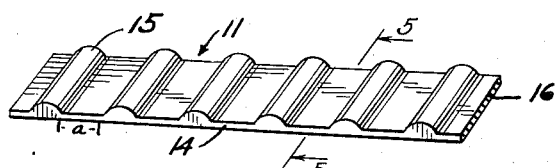
Figure 4 is a perspective view showing a short section of the spacer.
Figure 5:
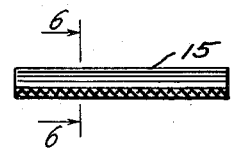
Figure 5 is a section taken on line 5—5, Figure 4.
Figure 6:
Figure 6 is a section taken on line 6—6, Figure 5.

Referring now more particularly to Fig. 4, it will be seen that the spacer consists of a strip of material which has been designated by reference numeral 14 and which is made from rubber composition, or from rubberized fabric. This strip has a width slightly greater than the normal distance between the sides of the reel so that it will engage the sides with considerable friction and hold them slightly spaced from the edges of the film. Since the strip itself is made of quite flexible material, it would not have sufficient strength to resist the forces against which it is designed to guard and in order to provide sufficient transverse strength, one side of the strip has been provided with a plurality of spaced transversely extending ridges or ribs 15 which are made from a rubber compound vulcanized to a hardness which makes them suitable to resist compressive forces and which, at the same time leaves the material sufficiently resilient and soft to prevent it from scratching the film or the reel, and which also assures that the transverse corrugations or ribs will not break.

In order to make the strip stronger than it would be if made entirely from rubber composition, and also to prevent it from stretching to any appreciable extent, it may be formed from rubberized cord fabric, such as is employed in the construction of automobile tires. In the drawing the cords have been designated by reference numeral 16 and extend lengthwise of the strip. The cords are, of course, coated on both sides with a layer of rubber composition. Instead of cord fabric, it is possible to employ ordinary rubberized woven fabric. The rubber composition that covers the cords or the fabric, or which forms the strip itself, can be quite soft and flexible and the transverse ridges may be made from a slightly different mix so that after the strip has been cured or vulcanized, the transverse ridges will become harder than the intermediate connecting material. This increased hardness of the ridges gives them an increased strength to resist compressive strains and does not interfere with the flexing of the strip when applying it, or removing it, from the film.

Figure 3:
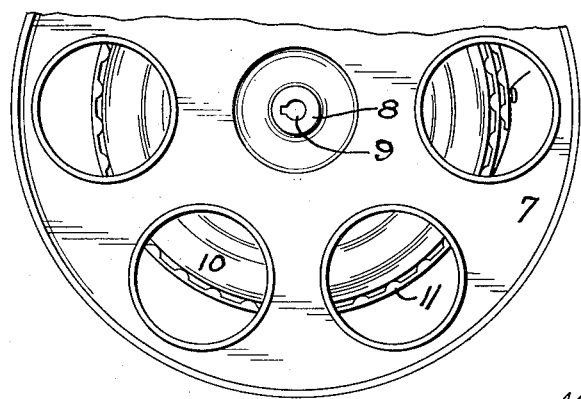
Figure 3 is a fragmentary side elevation similar to that shown in Figure 1, but showing the spacer positioned with the transverse corrugations turned inwardly.

The spacer and binder can be applied to the film in the manner shown in Fig. 1 in which the corrugations face outwardly, or it may be applied in the manner shown in Fig. 3, which shows the corrugations facing inwardly. The latter arrangement has this advantage, that it provides a smoother outer surface to which labels can be easily attached, whereas, if the transverse ridges are on the outside, there is more difficulty in attaching identifying labels.

Attention is called to the fact that the transverse ridges are spaced apart a considerable distance, which distance has been indicated by $a$ in Fig. 4. Since these transverse ridges are formed from a rather hard composition, there is no great need of a large number, and by spacing them in the manner shown, the strip will be light and will require less material in its manufacture.

Particular attention is called to the fact that the transverse ridges are of a different hardness than the body of the strip and form an integral part of the strip when constructed.

It has been found that where a strip like the one disclosed above is used for binding films in a reel having imperforate sides, the film will be protected against the drying action of the air and against the action of light to such an extent that the life of the film will be appreciably increased, since the film will remain pliable for a longer time than if it were exposed to the air.

Whenever the terms "rubber", "rubber compound", or "rubber-like compounds" are used in this application, they are intended to include both natural and synthetic rubbers.

Having described the invention what is claimed as new is:

1. A spacer for moving picture film reels and the like, comprising a strip formed in part from rubber compound, said strip having a width slightly greater than the distance between the sides of the reel and having one side provided with transversely extending ridges formed from rubber compound and vulcanized to a sufficient rigidity to resist inward movement of the sides of the reel.

2. A spacer for moving picture film reels comprising a strip of material formed from rubberized fabric, the strip having a width slightly greater than the distance between the sides of the reel and having one side provided with spaced transversely extending ridges forming compression members to resist inward movement of the sides of the reel.

3. A spacer for moving picture reels comprising a flexible strip of transversely corrugated material of a width slightly greater than the distance between the inner surfaces of the sides of the reel, the convex portions of the transverse corrugations being formed from slightly resilient rubber compound having a sufficient rigidity to resist any compressive strains tending to move the sides of the reel toward each other.

4. A spacer for moving picture film reels and the like, comprising an elongated strip of flexible material having one side provided with spaced transverse ridges formed from slightly resilient, rubberlike material having a greater modulus of rigidity than the strip and having a length greater than the distance between the sides of the reel.

5. A spacer for moving picture film reels and the like, comprising an elongated strip of flexible material having longitudinally extending tension members, embedded in rubber composition and having one side provided with longitudinally spaced transverse ridges of rubberlike compound having a greater modulus of rigidity than the strip and a length greater than the distance between the sides of the reel.

6. In a moving picture film reel having a hub and sides that are spaced apart a distance greater than the width of the film to be wound thereon, a spacer for holding the film from unwinding and for resisting sufficient inward movement of the sides to injure the film, said spacer comprising a strip formed in part from rubber compound, the strip having a width greater than the width of the film, one side of the spacer strip having transversely extending ridges formed from rubber compound and vulcanized to a sufficient rigidity to resist inward movement of the sides of the reel.

NATHAN GOLDBERG.